Oct. 14, 1952 — C. B. VARCO — 2,613,850
MECHANICAL SEED PLANTER
Filed July 23, 1947 — 2 SHEETS—SHEET 1
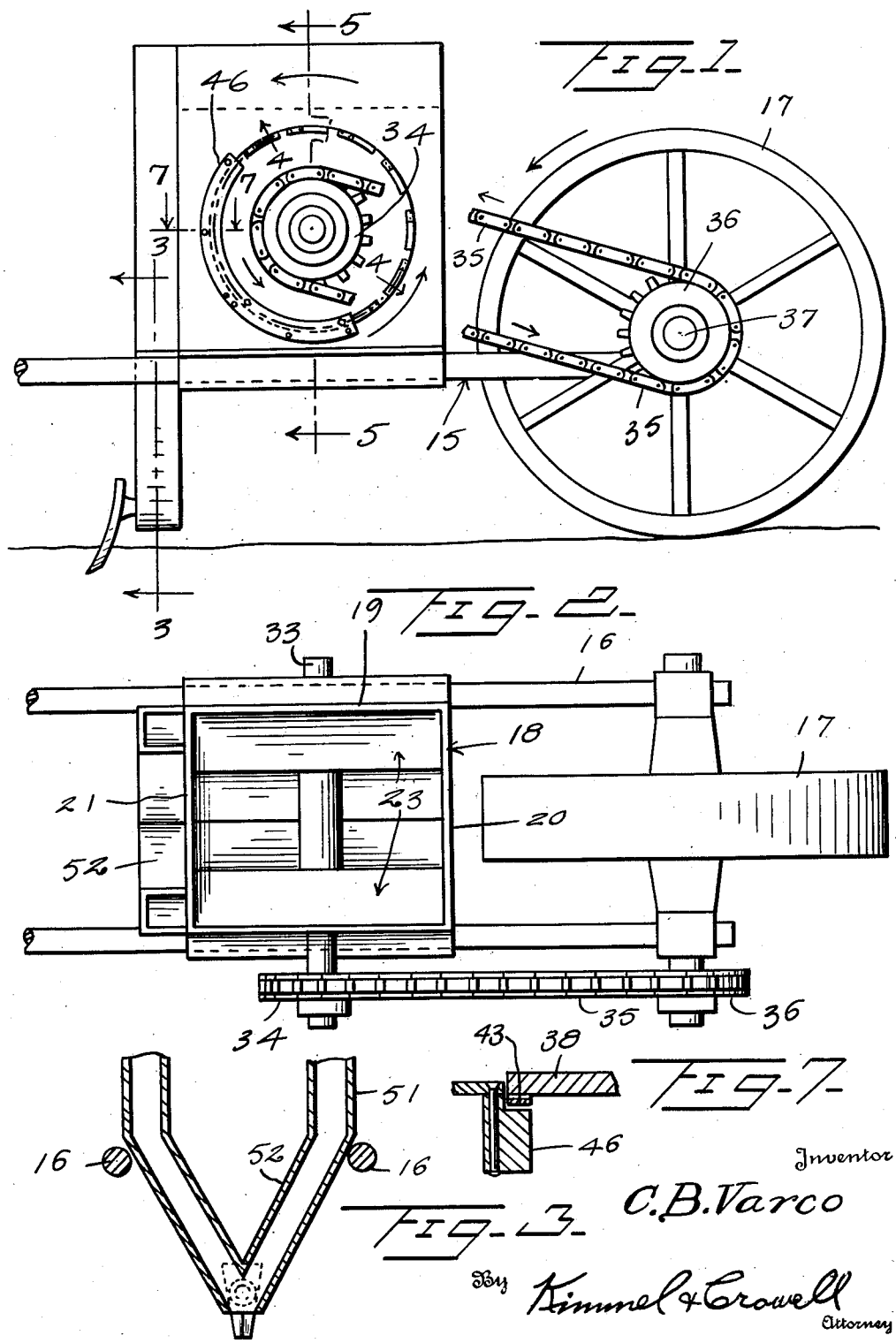
Inventor
C. B. Varco
By Kimmel & Crowell
Attorney Oct. 14, 1952     C. B. VARCO     2,613,850
MECHANICAL SEED PLANTER
Filed July 23, 1947     2 SHEETS—SHEET 2
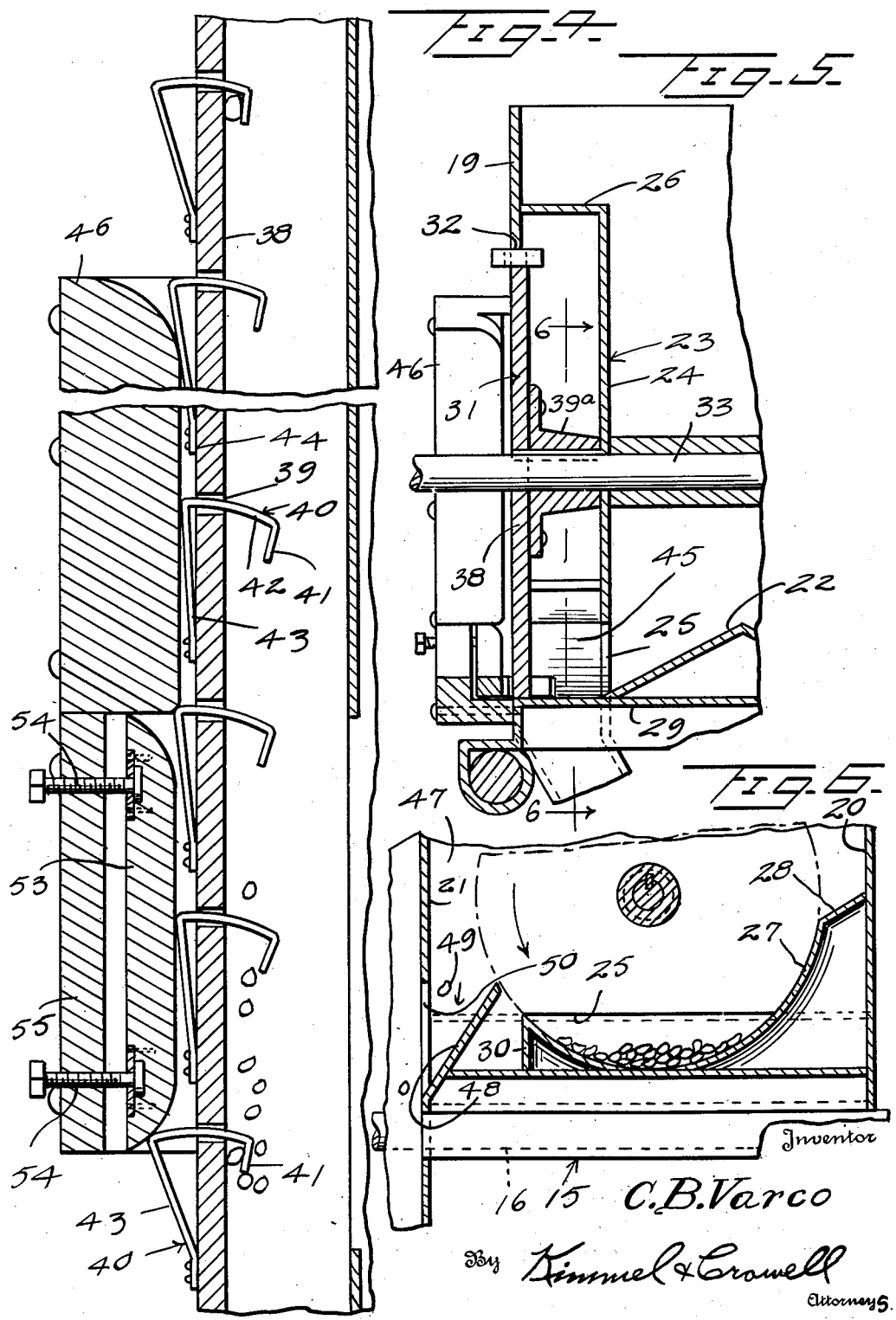

Patented Oct. 14, 1952

2,613,850

UNITED STATES PATENT OFFICE 2,613,850

MECHANICAL SEED PLANTER

Charles B. Varco, La Crosse, Wis.

Application July 23, 1947, Serial No. 762,896

2 Claims. (Cl. 222—12)

1

This invention relates to transfer or delivery devices.

An object of this invention is to provide an improved transfer or delivery device which in one adaptation thereof is designed to remove seeds or other articles one by one from a hopper, and discharge the seeds or articles singly. In another adaptation of the device the articles are transferred from one moving conveyor to a right angularly disposed conveyor, with the receiving conveyor moving at a greater speed than the delivering conveyor.

Another object of this invention is to provide a movable pick-up means for picking up articles at one point and transferring the articles to another point, the articles being yieldably gripped or clamped by means of a spring-pressed gripper or jaw, and the gripper or jaw is moved to released position by means of a stationary cam. The releasing cam may include a fixed cam portion for moving the gripper or jaw to completely released position, and also an adjustable cam portion which will hold the gripper or jaw in either completely or partially open position so that only one article will be gripped on the receiving cycle of the gripper or jaw.

A further object of this invention is to provide an improved transfer or delivery device of this kind which includes a hopper and a rotary delivery member, with the latter formed to remove seeds from a hopper one at a time and at regular intervals. The delivery member includes a rotary disc having a plurality of circumferentially spaced apart yieldable transfer members which in one cycle thereof enter a discharge chamber carried by the hopper and while passing through this chamber grab the seeds singly, and in another cycle thereof release the seeds for passage through a delivery chute.

With the above and other objects in view, my invention consists of the arrangement, combination and details of construction disclosed in the drawings and specification, and then more particularly pointed out in the appended claims.

In the drawings,

Figure 1 is a detail side elevation, partly broken away, of a seed planter constructed according to an embodiment of this invention, Figure 2 is a top plan view of the device, Figure 3 is a fragmentary sectional view taken on the line 3—3 of Figure 1, Figure 4 is a sectional view taken on the line 4—4 of Figure 1, showing the delivery means laid out in straight form, Figure 5 is a fragmentary sectional view taken on the line 5—5 of Figure 1, Figure 6 is a fragmentary sectional view taken on the line 6—6 of Figure 5, Figure 7 is a fragmentary sectional view taken on the line 7—7 of Figure 1.

2

Referring to the drawings, and first to Figures 1 to 7 inclusive, the numeral 15 designates generally a mobile frame having parallel side frame bars 16 on the rear ends of which is journaled a traction wheel 17. The frame 15 is adapted to be connected to a tractor device and moved over the surface of the ground.

A hopper 18 is secured to and extends upwardly from the frame 15 and is adapted to receive seed or the like for delivery of the seed to a delivery chute and deposit of the seed into a trough formed in the ground. The hopper 18 is formed of opposite side walls 19, rear end wall 20, and a front or forward end wall 21. The hopper 18 is formed with a V-shaped inner bottom 22 and a pair of oppositely disposed discharge housings 23 are secured to and extend inwardly from the side walls 19. These discharge housings 23 are of like construction and each includes an inner vertical wall 24 which is formed at the lower end thereof with a seed discharge opening 25.

A top wall 26 is secured to the upper end of the inner side wall 24 and extends outwardly to and is secured to the adjacent side wall 19. The housing 23 is formed with an arcuate bottom wall 27 which is secured at one end thereof to the end wall 20 of the hopper 18 by means of a connecting wall 28. The other end of the arcuate wall 27 is secured to the bottom wall 29 of the hopper 18 by means of a vertical connecting wall 30.

The arcuate wall 27 extends from the left end thereof from the edge of the opening 25 and at the opposite end rises above the opening 25, as shown in Figure 6.

A seed delivery or discharge means generally designated as 31 is rotatable in an opening 32 formed in the adjacent side wall 19. The delivery or discharge means 31 is secured to a shaft 33 having a sprocket 34 secured to one end thereof and about which a chain or flexible drive member 35 is trained. The chain or flexible drive member 35 is also trained about a driving sprocket 36 which is secured to the axle or shaft 37 of the traction wheel 17.

The delivery or discharge member 31 includes a disc 38 fixed by means of a bushing 39a to the shaft 33. The disc 38 is formed with a plurality of circumferentially spaced apart slots or openings 39 in the peripheral edge thereof and a plurality of yieldable seed gripping or clamping members generally designated as 40 loosely engage through the slots or openings 39. The seed gripping or clamping members 40 include a seed clamping jaw 41 disposed on the inner side of the disc 38 and a shank 42 is secured to the jaw 41 and extends through the opening or slot 39 to the outer side of the disc 38.

A stem 43 of inherently yieldable characteristics is secured to the outer end of the shank 42 and is fixed by fastening means 44 to the outer side of the disc 38. The stem 43 constantly urges the jaw 41 outwardly to substantially contacting position with respect to the inner face of the disc 38 so that the jaw 41 will normally hold a single seed between the jaw and the inner side of the disc 38. The disc 38 closes the outer side of the discharge housing 23 and has the lower portion thereof movable in the discharge chamber 45 in the lower portion of the housing 23, outwardly from the opening 25 in the wall 24.

The clamping or gripping members 40 are adapted to move through the chamber 45 with rotation of the disc 38 and are adapted to grasp at least one seed which is disposed in the chamber 45 and carry this seed upwardly and forwardly out of the chamber 45. A longitudinally arcuate releasing cam 46 is fixed to the adjacent side wall 19 of the hopper 18 and is disposed in a position to move the seed clamping or gripping members 40 inwardly to released or delivery position so that the seed will drop downwardly into a delivery chamber 47.

A downwardly and outwardly inclined guide wall or deflector 48 is carried by the hopper 18 and extends upwardly and inwardly to a point adjacent the peripheral edge of the disc 38 so that the released seeds 49 will drop downwardly and strike the baffle or deflector 48 and will then pass through an opening 50 in the forward wall 21. The seed will then drop downwardly into a tubular guide 51 and pass downwardly through a tubular arm 52 of a V-shaped guide which connects the two delivery or discharge members on the opposite sides of the hopper together.

In order to provide a means whereby the gripping or clamping members 40 will be moved inwardly to seed clamping or receiving position to receive and clamp a single seed, I have provided a longitudinally arcuate adjustable cam 53 which extends from the trailing end of the cam 46. The adjustable cam 53 is carried by adjusting bolts 54 which are threaded through a flange 55 fixed to the adjacent side wall 19 of the hopper 18. Through the use of the adjustable cam 53, adjustment may be made to a relatively fine degree so that seeds of different sizes may be used and discharged onto the ground by the machine and only one seed at a time picked up by the clamping or delivery members 40.

I do not mean to confine myself to the exact details of construction herein disclosed, but claim all variations falling within the purview of the appended claims.

What I claim is:

1. A seeding device comprising a mobile frame, a hopper carried by said frame, a discharge chamber carried by said hopper, and a rotary delivery member engageable at least partially in said discharge chamber for removing seeds from the latter, said delivery member comprising a rotary disc, said disc having a plurality of circumferentially spaced openings, an L-shaped seed clamping member for each opening having one side thereof extending loosely through said opening, and having the other side thereof confronting the adjacent face of said disc and constituting a seed clamping jaw, means comprising a resilient arm connected to each seed clamping member and at its other end to said disc constantly urging said clamping member inwardly to dispose said seed clamping member inwardly to dispose said seed clamping jaw against said adjacent face of said disc, and an elongated arcuate releasing cam engageable by said seed clamping members for moving the latter to released position and holding the same in said released position during a substantial portion of the path of travel of said disc, and a second elongated cam immediately adjacent said first cam, and means adjusting said second cam to maintain said seed clamping jaw in adjusted seed receiving position during that portion of the travel of said seed clamping jaw through said chamber.

2. A seeder comprising a hopper, a discharge chamber communicating with the lower portion of said hopper projecting laterally thereof and having an open outer side, a shaft journalled through said hopper a disc fixed to said shaft and confronting the open side of said chamber for closing the latter, a plurality of L-shaped seed clamping members carried by said disc, said disc having spaced openings through which one side of each clamping member loosely engages, an elongated resilient arm integral with said one side of each clamping member and disposed on the opposite side of said disc, means securing said arm to said disc, an elongated arcuate stationary cam engageable with said arms for moving said seed clamping members to seed releasing position during a substantial portion of the path of travel of said disc a second elongated arcuate cam immediately adjacent said first cam for moving and holding said seed clamping members in seed receiving position during a substantial portion of the path of travel of said disc immediately subsequent to the release of a seed, and means adjusting said second cam relative to said disc to accommodate seeds of various sizes.

CHARLES B. VARCO.

REFERENCES CITED

The following references are of record in the file of this patent:

UNITED STATES PATENTS

| Number | Name | Date |
|---|---|---|
| Re. 8,089 | Corbin | Feb. 19, 1878 |
| 290,389 | Brigham | Dec. 18, 1883 |
| 640,470 | Jewett | Jan. 2, 1900 |
| 687,383 | Milligan et al. | Apr. 8, 1902 |
| 726,972 | McCollister | May 5, 1903 |
| 785,932 | Baltzer et al. | Mar. 28, 1905 |
| 883,563 | Parrish | Mar. 31, 1908 |
| 1,016,265 | Hall | Feb. 6, 1912 |
| 1,352,411 | Hutton | Sept. 7, 1920 |
| 1,566,424 | Poleschensky | Dec. 22, 1925 |